United States Patent
Nishimura

(10) Patent No.: US 9,033,015 B2
(45) Date of Patent: May 19, 2015

(54) RUBBER-STEEL HYBRID CORD AND PNEUMATIC RADIAL TIRE (USING THE SAME)

(75) Inventor: Mitsuhiro Nishimura, Nasushiobara (JP)

(73) Assignee: Bridgestone Corporation, Tokyo (JP)

( * ) Notice: Subject to any disclaimer, the term of this patent is extended or adjusted under 35 U.S.C. 154(b) by 203 days.

(21) Appl. No.: 13/265,090

(22) PCT Filed: Apr. 19, 2010

(86) PCT No.: PCT/JP2010/002826
§ 371 (c)(1),
(2), (4) Date: Nov. 7, 2011

(87) PCT Pub. No.: WO2010/122772
PCT Pub. Date: Oct. 28, 2010

(65) Prior Publication Data
US 2012/0055602 A1   Mar. 8, 2012

(30) Foreign Application Priority Data

Apr. 20, 2009 (JP) ................. 2009-102384

(51) Int. Cl.
*B60C 9/00* (2006.01)
*D07B 1/06* (2006.01)
(Continued)

(52) U.S. Cl.
CPC ............ *B60C 9/0007* (2013.01); *D07B 1/162* (2013.01); *D07B 1/0613* (2013.01); *D07B 1/0626* (2013.01); *D07B 1/0666* (2013.01); *D07B 1/165* (2013.01); *D07B 7/145* (2013.01);
(Continued)

(58) Field of Classification Search
CPC ................ B60C 9/0007; B60C 2009/0021; D07B 1/0666; D07B 1/162; D07B 1/165
USPC ............ 152/451, 537, 564, 565; 57/223
See application file for complete search history.

(56) References Cited

U.S. PATENT DOCUMENTS

| 3,902,542 | A | * | 9/1975 | Imamura et al. ............... 152/527 |
| 5,279,695 | A | * | 1/1994 | Starinshak et al. ............ 156/296 |

(Continued)

FOREIGN PATENT DOCUMENTS

| EP | 1 186 699 A2 | 3/2002 |
| EP | 1 284 318 A1 | 2/2003 |

(Continued)

OTHER PUBLICATIONS

English machine translation of JP2008-202196, no date.*
(Continued)

*Primary Examiner* — Justin Fischer
*Assistant Examiner* — Robert Dye
(74) *Attorney, Agent, or Firm* — Sughrue Mion, PLLC

(57) ABSTRACT

A rubber-steel hybrid cord of the present invention is characteristically formed by twisting a plurality of sheath filaments or sheath strands around a core in which a periphery of and space surrounded by one or a plurality of core filaments or a core strand are coated or filled with a filler rubber (A) containing an adhesion promoter, thereby forming a multilayer-twist steel cord or a multi-twist steel cord, and coating an outer surface of the multilayer-twist steel cord or the multi-twist steel cord with a coating rubber (C). Further, an amount of an adhesion promoter contained in the coating rubber (C) is equal to or more than an amount of the adhesion promoter contained in the filler rubber (A).

4 Claims, 8 Drawing Sheets

(51) Int. Cl.
 *D07B 1/16* (2006.01)
 *D07B 7/14* (2006.01)
(52) U.S. Cl.
 CPC . *D07B2201/2046* (2013.01); *D07B 2201/2061* (2013.01); *D07B 2201/2062* (2013.01); *D07B 2201/2065* (2013.01); *D07B 2207/205* (2013.01); *D07B 2207/4072* (2013.01); *D07B 2501/2046* (2013.01); *B60C 2009/0021* (2013.01)

(56) References Cited

U.S. PATENT DOCUMENTS

| | | | |
|---|---|---|---|
| 8,191,348 B2 * | 6/2012 | Barguet et al. | 57/223 |
| 2002/0053386 A1 | 5/2002 | Hirachi et al. | |
| 2008/0047650 A1 * | 2/2008 | Kaneda et al. | 152/537 |

FOREIGN PATENT DOCUMENTS

| | | | |
|---|---|---|---|
| FR | WO2006/013077 | * | 2/2006 |
| GB | 562137 | * | 6/1944 |
| JP | 09-109608 A | | 4/1997 |
| JP | 2002-88667 A | | 3/2002 |
| JP | 2002-302885 A | | 10/2002 |
| JP | 2002-338749 A | | 11/2002 |
| JP | 2003-11613 A | | 1/2003 |
| JP | 2007-313944 A | | 12/2007 |
| JP | 2008-202196 A | | 9/2008 |
| JP | 2008-308808 A | | 12/2008 |

OTHER PUBLICATIONS

Supplementary European Search Report issued on Dec. 5, 2012 from the European Patent Office in corresponding European Application No. 10 76 6834.
Office Action issued on Dec. 10, 2013 from the Japanese Patent Office in a counterpart Japanese Application No. 2009-102384.
Office Action dated Dec. 4, 2013 from the People's Republic of China Patent Office in a counterpart Chinese Application No. 2010800272279.2.
Office Action issued on Mar. 21, 2014 from the European Patent Office in European Application No. 10766834.5.
Communication dated Jul. 22, 2014 from the State Intellectual Property Office of P.R. China in counterpart Chinese application No. 201080027279.2.

* cited by examiner

FIG. 3
(a)
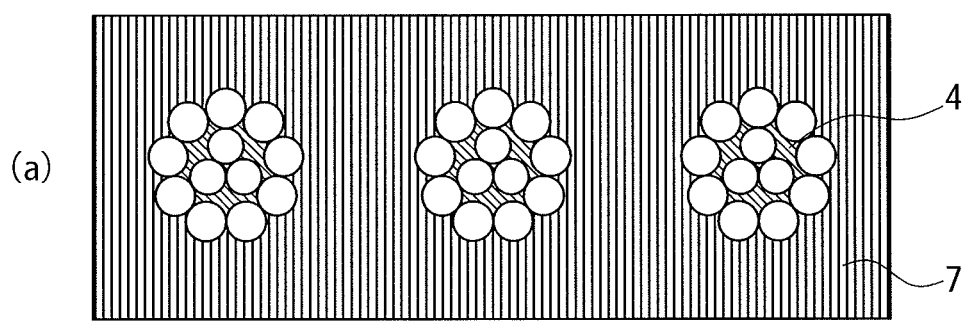
(b)
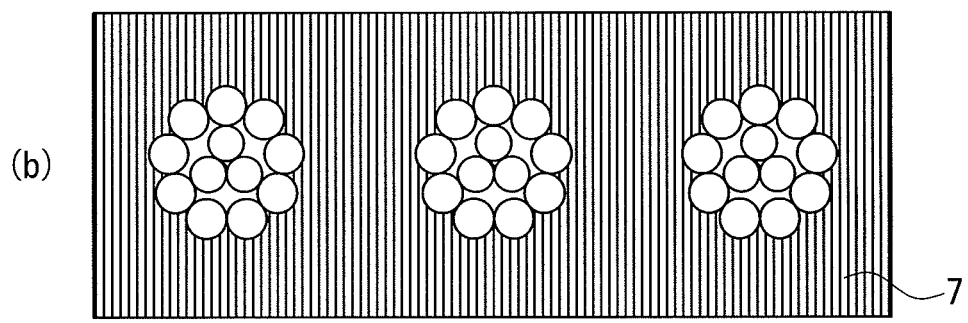

FIG. 5
(a)
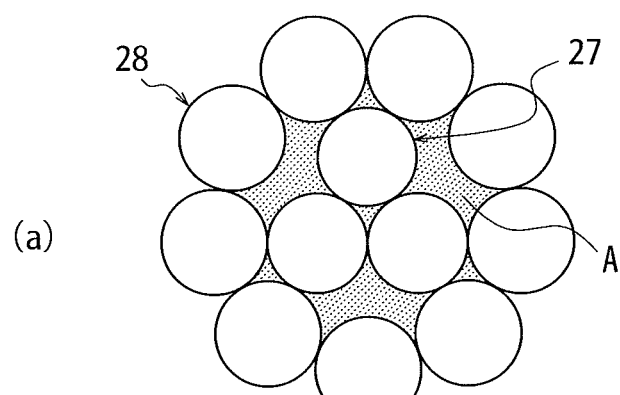
(b)
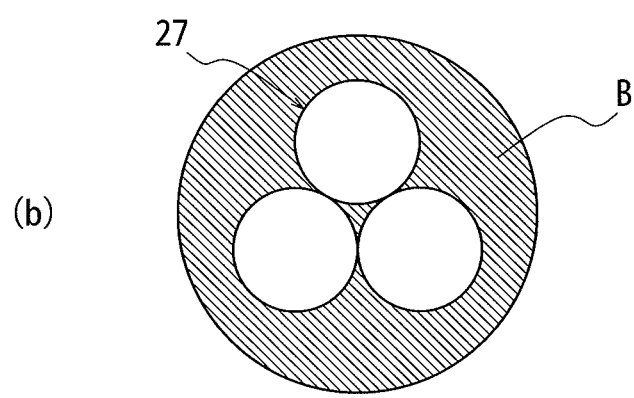

RUBBER-STEEL HYBRID CORD AND PNEUMATIC RADIAL TIRE (USING THE SAME)

CROSS REFERENCE TO RELATED APPLICATIONS

This application is a National Stage of International Application No. PCT/JP2010/002826, filed on Apr. 19, 2010, which claims priority from Japanese Patent Application No. 2009-102384, filed on Apr. 20, 2009, the contents of all of which are incorporated herein by reference in their entirety.

TECHNICAL FIELD

The present invention relates to a rubber-steel hybrid cord used as a reinforcing member for a pneumatic radial tire and to a pneumatic radial tire having a reinforcement layer formed using the rubber-steel hybrid cord.

RELATED ART

Since high strength is required of cords used for reinforcing a pneumatic radial tire, a cord made by twisting a plurality of sheath filaments around a core filament, or a cord having a so-called multilayer-twist structure in which a plurality of filaments are twisted around a core strand and a plurality of sheath strands are further twisted around the core strand, is used for this purpose. These cords are aligned and covered with a sheet-like coating rubber to obtain a hybrid rubber cord can be obtained.

Such coating rubber contains an adhesion promoter component for promoting adhesion with a cord such as a steel cord, and a great amount of sulfur. Cobalt salts of organic acids are typical for such an adhesion promoter; however, when a cobalt salt of an organic acid is contained in a high proportion, it would react with a vulcanization accelerator, an age resistor, or the like to impair adhesiveness or aging resistance of the rubber after being left in an unvulcanized state. On the other hand, when sulfur is contained in a high proportion, a problem may arise in that vulcanization would proceed excessively before a vulcanization step to deteriorate the rubber properties after vulcanization.

Under such circumstances, in an attempt to solve problems described above, various kinds of hybrid rubber cords provided with a rubber layer covering the periphery of a cord in addition to a coating rubber have been developed (See Patent Documents 1 to 3).

PRIOR ART DOCUMENTS

Patent Documents

Patent Document 1: Japanese Patent Application Publication No. 2002-338749
Patent Document 2: Japanese Patent Application Publication No. 2003-11613
Patent Document 3: Japanese Patent Application Publication No. 2007-313944

DISCLOSURE OF THE INVENTION

Problems to be Solved by the Invention

Nevertheless, any of such hybrid rubber cords are not so helpful to overcome the above-mentioned problems caused by a high proportion of an adhesion promoter or sulfur.

In view of the above, an object of the present invention is to provide a rubber-steel hybrid cord which makes it possible to sufficiently reduce the proportion of an adhesion promoter or sulfur while maintaining good adhesiveness, and to provide a pneumatic radial tire using the same as a reinforcement layer.

Means for Solving the Problem

In order to solve the above problems, the present inventor focused on a phenomenon that the provision of a filler rubber layer on a core diffuses and transfers an adhesion promoter and sulfur from the coating rubber to the filler rubber at the time of vulcanization and found a rubber-steel hybrid cord utilizing the phenomenon to accomplish the present invention.

Specifically, the rubber-steel hybrid cord of the present invention is characteristically formed by twisting a plurality of sheath filaments or sheath strands around a core in which a periphery of and space surrounded by one or a plurality of core filaments or a core strand are coated or filled with a filler rubber (A) containing an adhesion promoter, thereby forming a multilayer-twist steel cord or a multi-twist steel cord, and coating an outer surface of the multilayer-twist steel cord or the multi-twist steel cord with a coating rubber (C). Further, an amount of an adhesion promoter contained in the coating rubber (C) is equal to or more than an amount of the adhesion promoter contained in the filler rubber (A). Preferably, the filler rubber (A) does not contain any adhesion promoter.

Further, the filler rubber (A) and the coating rubber (C) contain sulfur, and an amount of sulfur in the filler rubber (A) is preferably equal to or less than an amount of sulfur contained in the coating rubber (C). A pneumatic radial tire according to the present invention characteristically includes a reinforcement layer made of such a rubber-steel hybrid cord.

Effect of the Invention

A rubber-steel hybrid cord according to the present invention uses a filler rubber containing an adhesion promoter the amount of which is reduced to a minimum; therefore, reduction in aging resistance of the filler rubber in the cord can be prevented effectively as a whole. Further, the presence of a filler rubber in a core can increase the area of contact between filaments or strands of the core and the rubber, which allows the adhesion to be stronger and to have higher durability.

Furthermore, the amount of sulfur in the filler rubber can be reduced effectively, which can effectively suppress advancement of vulcanization in vulcanization in progress or before a vulcanization step in fabricating a cord. With the use of such a rubber-steel hybrid cord of the present invention as a reinforcement layer, a pneumatic radial tire with excellent durability can be realized.

BRIEF DESCRIPTION OF THE DRAWINGS

FIG. 3(a) is a schematic view illustrating a first aspect of a rubber-steel hybrid cord of the present invention, and FIG. 3(b) is a schematic view illustrating a conventional rubber-steel hybrid cord.

FIG. 5(a) is a diagram illustrating a cross-sectional area A of the interspace between a core and sheaths, and FIG. 5(b) is a diagram illustrating a cross-sectional area B of a filler rubber layer occupying the interspace between a core and sheaths.

BEST MODE FOR CARRYING OUT THE INVENTION

Hereinafter, the present invention will be described in detail with reference to the drawings as necessary.

Figure 1:
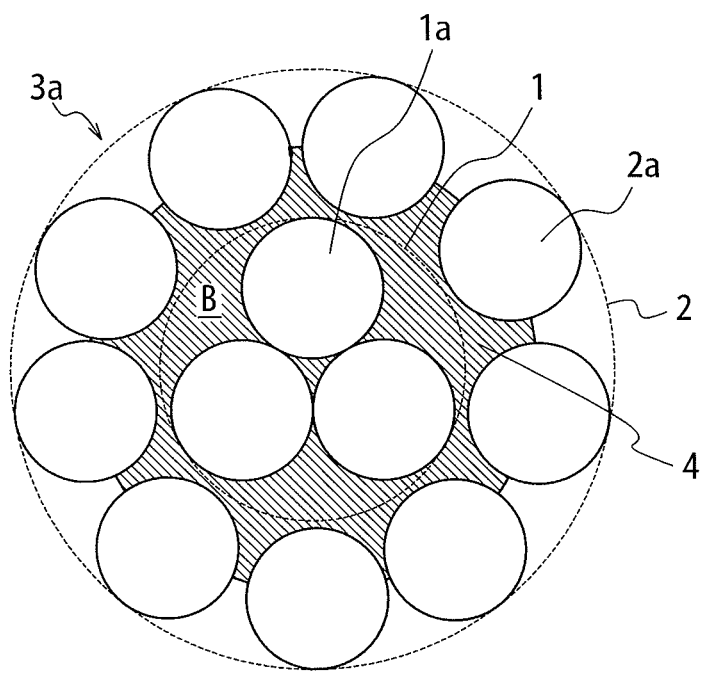
FIG. 1 is a diagram illustrating a multilayer-twist steel cord having a 3+9 structure in which filaments having the same diameter are twisted together.

FIG. 1 shows a cross section of a cord according to the present invention, which is perpendicular to the axial directions of the cord.

FIG. 1 shows a steel cord used for a rubber-steel hybrid cord of the present invention, which is a multilayer-twist steel cord $3a$ made by twisting filaments (or strands) having the same diameter, in which nine sheath filaments (or sheath strands) $2a$ forming a sheath 2 are twisted around a core 1 including 3 core filaments (or a core strand) $1a$. This multilayer-twist steel cord $3a$ has a filler rubber (A) layer 4 between the core 1 and the sheath 2 as shown with hatch lines in FIG. 1. Note that, when the core strand and the sheath strands are used, the plurality of strands are twisted together to form a multi-twist steel cord $3b$ as shown in FIGS. 2(a) to (c). FIG. 2(a) shows a multi-twist steel cord having a filler rubber (A) layer 4 around a core strand 5, FIG. 2(b) shows a multi-twist steel cord in which a plurality of steel cords shown in FIG. 1 are twisted together, and FIG. 2(c) shows a multi-twist steel cord formed by coating a plurality of steel cords shown in FIG. 1 that are twisted together are further coated with a filler rubber (A).

A rubber-steel hybrid cord of the present invention is formed by twisting a plurality of sheath filaments (or sheath strands) around a core made by coating or filling the periphery of and the space surrounded by the one or plurality of core filaments (or the core strand) with the filler rubber (A) to form multilayer-twist steel cords (or multi-twist steel cords), and coating the outer surfaces of the steel cords with a coating rubber (C). In other words, as shown in the schematic view of FIG. 3(a), the rubber-steel hybrid cord has a rubber layer composed of two layers of the filler rubber (A) layer 4 and the coating rubber (C) layer 7. In conventional rubber-steel hybrid cords, the periphery of and the space surrounded by the core filaments (or core strand) are not coated or filled with the filler rubber (A), for example as shown in FIG. 3(b). On the other hand, a rubber-steel hybrid cord of the present invention is formed through coating or filling with the filler rubber (A) as described above, thus achieving strong adhesiveness between these core filaments (or core strand) and the rubber and high durability. Further, the filler rubber (A) suppresses fretting and improves corrosion fatigue resistance.

Figure 2:
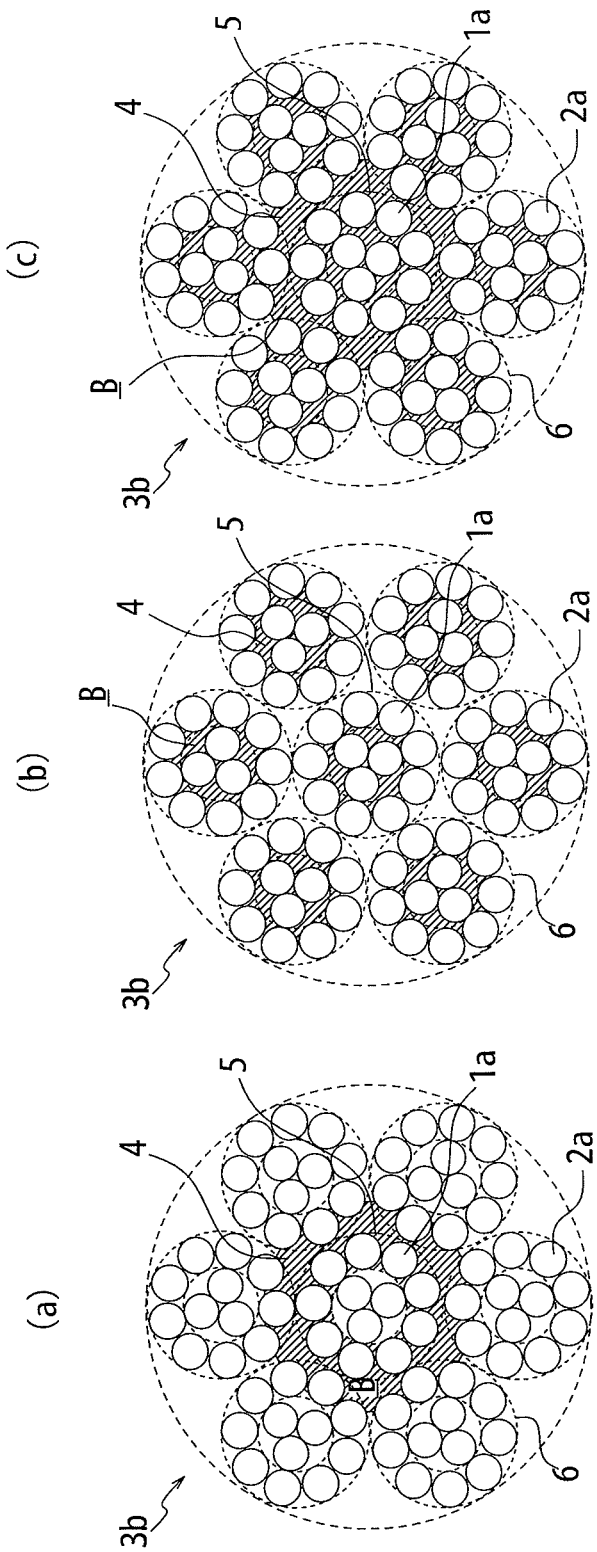
FIGS. 2(a) to 2(c) are diagrams each illustrating a multilayer-twist steel cord having a 3+9 structure in which filaments having the same diameter are twisted together.

Note that, as long as at least a part of the periphery of and the space surrounded by the one or plurality of core filaments (or the core strand) should be filled with the filler rubber (A), the filler rubber (A) should not necessarily extrude from the outer surface of the core filaments (or the core strand). Further, FIG. 2 shows an aspect in which the periphery of and the space surrounded by the core filaments forming the core strand is not coated or filled with the filler rubber (A); however, the periphery of and the space surrounded by each filament may be coated or filled with the filler rubber (A).

Steel for forming a cord used for the present invention is not limited in particular; however, the filaments (or strands) are preferably brass-coated by means of typical methods such as plating methods, various CVD methods, or PVD methods to improve adhesiveness to a vulcanized rubber.

A rubber ingredient used for the filler rubber (A) and the coating rubber (C) is not limited as long as it can be used for a tire. Examples of the rubber ingredient include natural rubber (NR) and synthetic rubbers such as polybutadiene rubber (BR), styrene butadiene copolymer rubber (SBR), styrene isoprene copolymer rubber (SIR), polyisoprene rubber (IR), butyl rubber (IIR), acrylonitrile-butadiene rubber, chloroprene rubber, and ethylene-propylene copolymers; however, it is desirable to use natural rubber (NR) alone.

In addition to the above rubber ingredients, an additive agent, an adhesion promoter, or the like is added as appropriate depending on respective characteristics required of the filler rubber (A) and the coating rubber (C).

The additive agent may be a filler; for example, a carbon black such as SRF, GPF, FER, HAF, or ISAF; silica; calcium carbonate; talc; or the like can be used. When a carbon black is added, the amount of the carbon black is preferably 40 to 60 parts by mass relative to 100 parts by mass of the rubber component.

The adhesion promoter may be a cobalt salt of an organic acid; for example, cobalt naphthenate, cobalt rosinate, linear or branched cobalt monocarboxylate having about 5 to 20 carbon atoms, or the like can be used.

As other additive agents, a vulcanizing agent such as sulfur, an age resistor, a vulcanization accelerator, a processing aid such as zinc oxide, an antiozonant, a plasticizer, or the like can be added. Hereinafter, characteristic compositions of the filler rubber (A) and the coating rubber (C) in a rubber-steel hybrid cord of the present invention will be described.

<Filler Rubber (A)>

In a rubber-steel hybrid cord of the present invention, the amount of the adhesion promoter contained in the filler rubber (A) is equal to or less than the amount of the adhesion promoter contained in the coating rubber (C) to be described below, preferably less than the amount of the adhesion promoter contained in the coating rubber (C). More preferably, the filler rubber (A) does not contain any adhesion promoter. Specifically, the amount of the filler rubber (A) is usually 0 to 3.0 parts by mass and preferably 0 parts by mass relative to 100 parts by mass of the rubber component. Thus, although the amount of the adhesion promoter contained in the filler rubber (A) is reduced, an adhesion promoter diffuses and transfers from the coating rubber (C) at the time of vulcanization. Therefore, good adhesiveness can be maintained sufficiently. Besides, the amount within the above range can effectively reduce reaction to the vulcanization accelerator, age resistor, or the like added to the filler rubber (A), and suppress decrease in the adhesiveness and aging resistance when being left unvulcanized.

Further, when the above filler rubber (A) contains sulfur, the sulfur content is preferably equal to or less than the amount of sulfur contained in the coating rubber (C), preferably less than the amount of sulfur contained in the coating rubber (C). Specifically, the amount is usually 3.0 to 7.0 parts by mass and preferably 3.0 to 5.0 parts by mass relative to 100 parts by mass of the rubber component. Thus, although the amount of sulfur contained in the filler rubber (A) is reduced, sulfur diffuses and transfers from the coating rubber (C) at the time of vulcanization. Therefore, good adhesiveness can be obtained sufficiently. This makes it possible to suppress advancement of vulcanization before the vulcanization more effectively, which greatly contributes to improvement in operability.

<Coating Rubber (C)>

The amount of the adhesion promoter contained in the coating rubber (C) is equal to or more than the amount of the adhesion promoter contained in the above filler rubber (A), preferably more than the amount of the adhesion promoter contained in the filler rubber (A). Specifically, the amount is usually 1.0 to 5.0 parts by mass, preferably 1.0 to 3.0 parts by mass relative to 100 parts by mass of the rubber component. When the amount is equal to or more than the lower limit mentioned above, even if the adhesion promoter diffuses and transfers to the filler rubber (A), a sufficient amount of the adhesion promoter can remain in the coating rubber (C) after vulcanization. Thus, even the initial adhesiveness would not be reduced more than necessary while maintaining excellent deterioration adhesiveness to the steel cords. On the other hand, when the amount of the contained adhesion promoter exceeds the upper limit mentioned above, it is difficult to achieve significantly good adhesion promoting effects, and the adhesiveness after shelf deterioration would be insufficient. In this manner, a sufficient amount of the adhesion promoter can be donated from the coating rubber (C) to the filler rubber (A) which directly contacts the steel cords, which can effectively ensure strong adhesion between the steel cords and the rubber, and contributes to the improvement in initial adhesiveness.

Further, when the above coating rubber (C) contains sulfur, the amount of sulfur contained is equal to or more than the amount of sulfur contained in the filler rubber (A), and preferably more than the amount of sulfur contained in the filler rubber (A). Specifically, the amount is usually 3.0 to 7.0 parts by mass and preferably 5.0 to 7.0 parts by mass relative to 100 parts by mass of the rubber component. When the amount is equal to or more than the above lower limit, even if sulfur diffuses and transfers to the adhesion promoter, a sufficient amount of the adhesion promoter can remain in the coating rubber (C) at the time of vulcanization. Thus, excellent adhesiveness to the steel cords can be achieved effectively. On the other hand, when the sulfur content exceeds the upper limit mentioned above, fatigue fracture resistance would decrease.

[Method of Producing Rubber-Steel Hybrid Cord]

Figure 4:
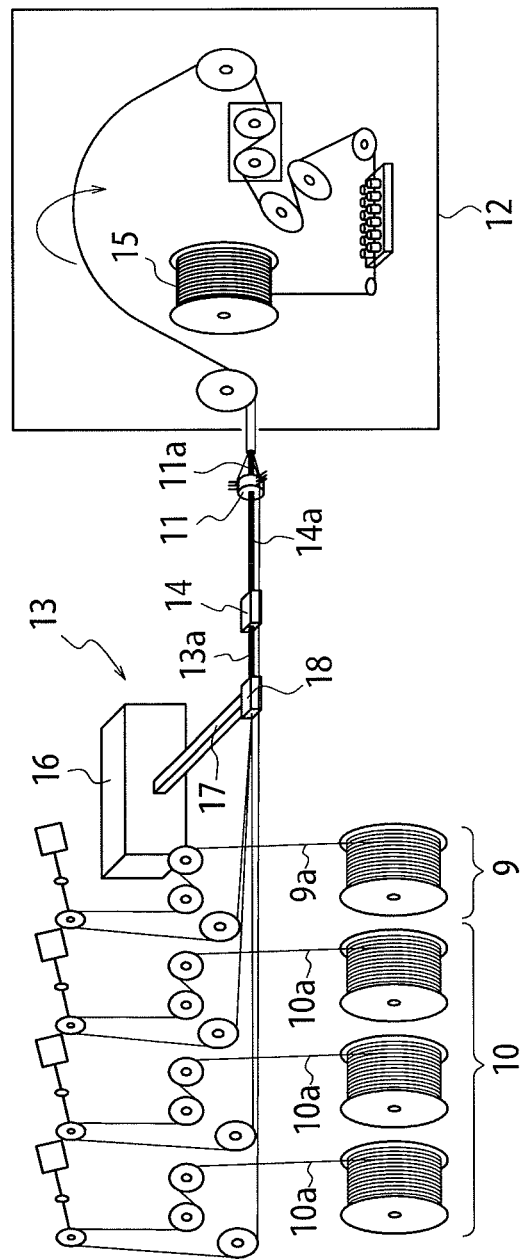
FIG. 4 is a diagram illustrating a typical cord production system used for producing cords used in the present invention.

According to a rubber-steel hybrid cord of the present invention, a cord is produced first using, for example, a cord production system shown in FIG. 4. The cord production system is equipped with a core supply 9 which supplies a core portion 9a formed by twisting a plurality of core filaments together and a given number of sheath supplies 10 which supply sheath filaments 10a, and is provided with a wire collector 11 which collects the filaments wound off from each supply, and a wire twisting machine 12 twists the collected filaments together. Further, a rubber coater 13 for coating the core portion 9a with an unvulcanized filler rubber (A) is provided between the core supply 9 and the wire collector 11.

Next, in a method of producing a cord using the above-mentioned cord production system, a core portion 9a wound around the core supply 9 is would off first to be lead to the rubber coater 13 side, the core portion 9a is coated with the filler rubber (A) by means of the rubber coater 13 to form a rubber-coated filament 13a. Then, the rubber-coated filament 13a is supplied to the wire collector 11 provided on the side of entrance to the wire twisting machine 12, the sheath filaments 10a wound off from the sheath supplies 10 are collected around the rubber-coated filament 13a by the wire collector 11 to form a bundled filaments 11a, and the bundled filaments 11a are supplied to the wire twisting machine 12. After that, the bundled filaments 11a are twisted together by the wire twisting machine 12 to form a cord 15.

On this occasion, the core portion 9a wound off from the core supply 9 is preferably supplied to the wire twisting machine 12 after being coated with a given amount of the filler rubber (A) as described below. Thus, the given amount of the filler rubber (A) (filler rubber (A) layer 4) is provided, so that the filler rubber (A) can be prevented from protruding beyond necessity between the sheath filaments twisted together to form the cord. Besides, the interspace in the core portion 9a is filled with an appropriate amount of the filler rubber (A). The given amount of the filler rubber (A) is an amount which satisfies $A \leq B \leq 10A$, wherein A denotes the area A of the interspace between the core and sheaths and B denotes the area B of the filler rubber (A) layer occupying the space between the core and the sheaths in a cross section perpendicular to the axial directions of the cord.

The area A of the interspace between the core and the sheaths is defined on the basis of a closed cord. For example, in a closed cord having the same structure as FIG. 1, the interspace between the core and the sheaths in the cross section perpendicular to the axial directions of the cord having a closed structure shown in FIG. 5(a) {the dotted area in FIG. 5} is defined as the area A. Note that the interspace between the sheaths 28 which does not involve the core 27 is excluded.

Further, as shown in FIG. 1, the area B of the filler rubber (A) layer 4 occupying the space between the core 27 and the sheaths 28 corresponds to a rubber portion covering the periphery of the core (hatched area). Now; in fabricating the cord shown in FIG. 1, to form the filler rubber (A) layer 4 having an area which is 1 to 10 times the area A, as shown in FIG. 5(b), the periphery of the core filaments may be coated with the filler rubber (A) corresponding to the area B and then, the sheath filaments may be entwisted.

Figure 6:
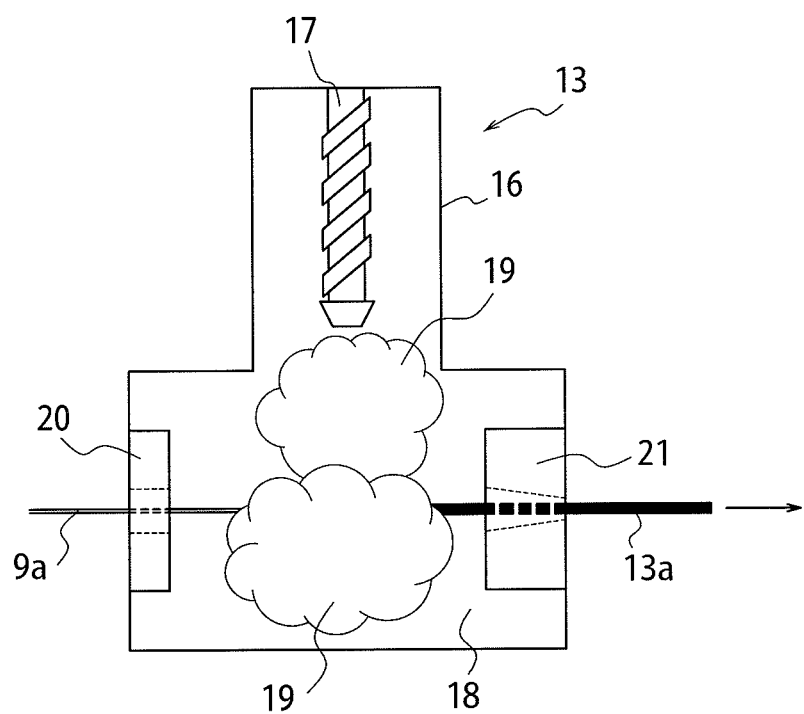
FIG. 6 is a diagram illustrating a manner of coating a core filament with a filler rubber using a rubber coater.

The rubber coater 13 for coating the core portion 9a with the filler rubber (A) has, for example, a rubber extruder 16 and a rubber extruder head portion 18 as shown in FIG. 6. Here, with respect to the rubber extruder 16 and the inside of the rubber extruder head portion 18 shown in FIG. 6, in the rubber coater 13, rubber 19 is extruded from the rubber extruder 16 side through the rubber extruder screw 17 to the rubber extruder head portion 18 to fill the inside of the rubber extruder head portion 18 with the filler rubber (A). Then, the core portion 9a is supplied to the rubber extruder head portion 18 through a cord guide 20 provided on the side of entrance to the rubber extruder head portion 18, and the periphery of the core portion 9a is coated with the filler rubber (A) 19 while being passed through the rubber extruder head portion 18. After that, the core portion 9a coated with the filler rubber (A) 19 is lead to the outside of the rubber extruder head portion 18 through a base cap 21 provided on the side of exit from the rubber extruder head portion 18 while the thickness of the coating rubber (B) is controlled to form a filler rubber (A)-coated filament 13a.

Note that in coating the core portion 9a with the filler rubber (A) in the rubber coater 13, a plurality of core filaments are coated simultaneously in the present invention; however, the core filaments may be coated one by one.

Thereafter, the obtained plurality of cords are arranged in parallel at intervals of 1.5 mm to 2.0 mm, coated with the coating rubber (C) from above and below, and cut with a width and at an angle depending on the desired portion, thereby obtaining a rubber-steel hybrid cord.

Figure 7:
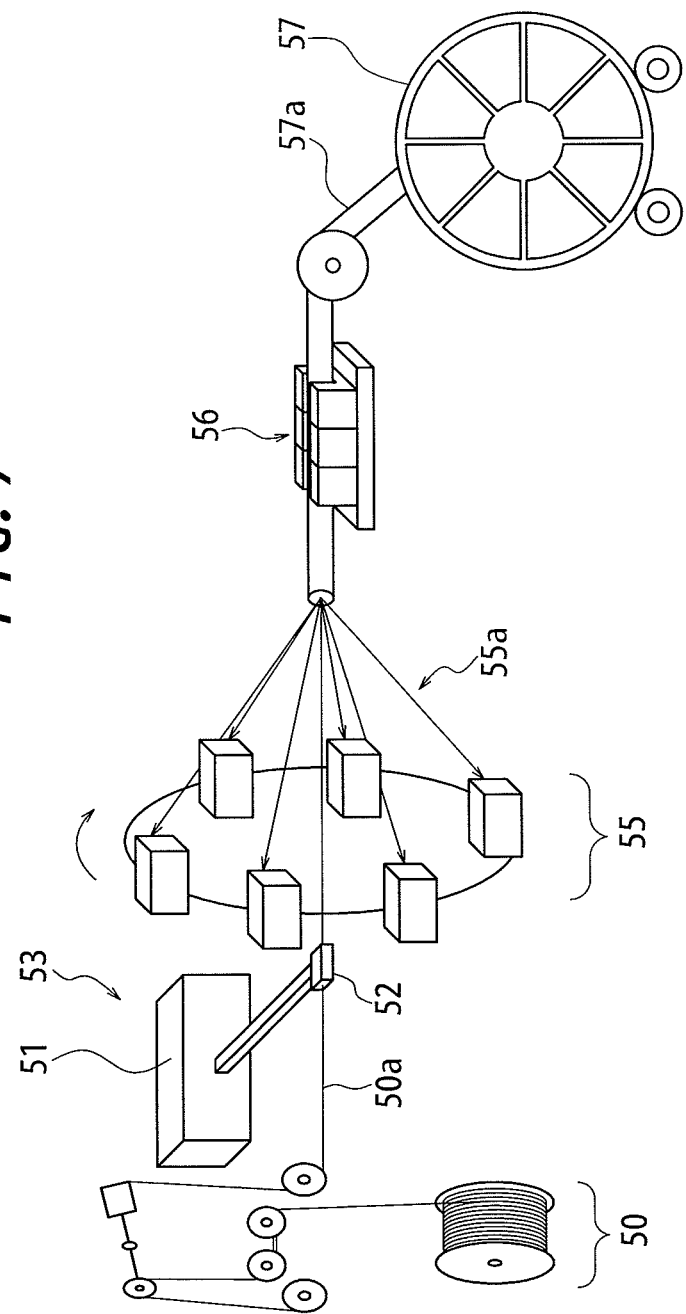
FIG. 7 is a diagram illustrating a cord production system used for producing a multi-twist steel cord.

FIG. 7 shows an example of a production system used especially for producing multi-twist steel cords. This cord system is provided with a core strand supply 50 which supplies a core strand 50a, and provided with a rubber coater 53 including a rubber extruder 51 and a rubber extruder head portion 52 for coating a core strand 50a with the unvulcanized filler rubber (A) between the core strand supply 50 and the sheath strand supplies 55. Then, the core strand 50a lead from the rubber extruder head portion 52 of the rubber coater 53 is supplied to the sheath strand supplies 55 provided separately for supplying sheath strands 55a, shaped through a straightener 56 to form a multi-twist cord 57a, which is transferred to a multi-twist cord reel 57. After that, coating with the coating rubber (C) is performed in a manner similar to the above to obtain a rubber-steel hybrid cord.

[Pneumatic Radial Tire]

A rubber-steel hybrid cord of the present invention is employed as a reinforcement layer of a belt layer, a carcass layer, or a bead portion of a pneumatic radial tire, which allows adhesion durability, aging resistance, fatigue fracture resistance, and the like of this reinforcement layer to improve. Accordingly, a high-performance pneumatic radial tire having excellent durability can be realized.

Further, it is made possible to improve productivity or ease of handling of multilayer-twist steel cords or multi-twist steel cords, and more efficient production of rubber-steel hybrid cords and pneumatic radial tires using those cords can be realized.

The present invention will be demonstrated below based on examples; however, the present invention is not limited to those examples.

Examples 1 to 7, Comparative Examples 1 to 3

Rubbers were formed in accordance with the compositions shown in Table 2, and steel cords and a rubber-steel hybrid cords of the aspect shown in the schematic view of FIG. 3(a) were fabricated using the rubbers by the above-mentioned method and evaluated with respect to the evaluation items below. Note that conventional rubber-steel hybrid cords in which steel cords were coated with only a coating rubber (C) as shown in the schematic view of FIG. 3(b) were fabricated as Reference 1 and Comparative Examples 1 to 2. In Comparative Example 3, the amount of an adhesion promoter contained in the coating rubber (C) was less than the amount of the adhesion promoter in a filler rubber (A) in accordance with the rubber-steel hybrid cord of the aspect shown in the schematic view of FIG. 3(a). The results are shown in Table 3.

<Initial Adhesiveness>

3+9×0.22 mm steel cords shown in FIG. 1 were arranged in parallel at intervals of 1.5 mm, and were coated with the rubbers having respective compositions from above and below the steel cords. They were vulcanized at 145° C. for 15 minutes to make samples. The samples were left at room temperature for 1 hour, and the steel cords were then extracted and the rubber coverage of the steel cords was evaluated by visual examination in accordance with the evaluation criteria shown in Table 1.

<Adhesiveness after Shelf Deterioration>

3+9×0.22 mm steel cords shown in FIG. 1 were arranged in parallel at intervals of 1.5 mm, and were coated with the rubbers having respective compositions from above and below the steel cords to be left at a temperature of 35° C. and a humidity of 75% for 7 days. They were vulcanized at 145° C. for 40 minutes to make samples. The steel cords were then extracted and the rubber coverage of the steel cords was evaluated by visual examination in accordance with the evaluation criteria shown in Table 1 in a manner similar to the evaluation of the initial adhesiveness.

TABLE 1

| Evaluation | Rubber coverage |
|---|---|
| A | 100% |
| B++ | 99-95% |
| B+ | 94-85% |
| B− | 84-75% |
| C | 74-50% |
| D | 49-25% |
| E | 24-0% |

<Evaluation of Corrosion Fatigue Resistance>

Figure 8:
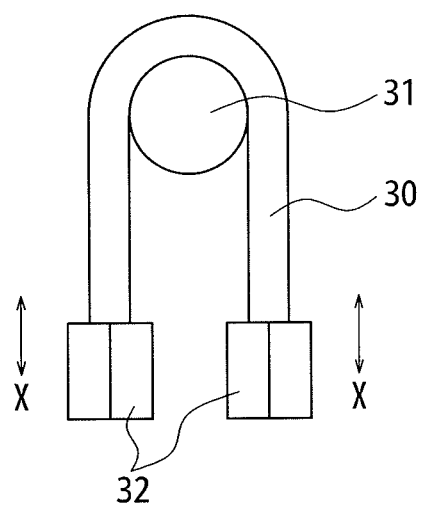
FIG. 8 is a diagram illustrating a device for evaluating corrosion fatigue resistance.

3+9×0.22 mm steel cords shown in FIG. 1 were arranged in parallel at intervals of 1.5 mm, and were coated with the rubbers having respective compositions from above and below the steel cords. They were vulcanized at 145° C. for 40 minutes. Next, a bundle of three steel cords (upper gauge: 1.0 mm, lower gauge: 2.0 mm, total gauge: 3.9 mm, cord pitch: 1.5 mm) was cut out as a sample and the sample was immersed in hot water of 70° C. for 12 hours. After that, using a device shown in FIG. 8, each sample 30 was made to run over a pulley 31 (diameter: 22 mm), and the sample 30 was driven horizontally in the direction X while applying a tension at a cord strength of 7.0% thereto to measure the number of repetitions which have caused rupture of the sample 30. The obtained results are shown with indices relative to a reference of 100. Higher numerical values indicate higher corrosion fatigue resistances.

TABLE 2

|  | Rubber 1 | Rubber 2 | Rubber 3 | Rubber 4 | Rubber 5 | Rubber 6 | Rubber 7 |
|---|---|---|---|---|---|---|---|
| Natural rubber (NR) | 100 | 100 | 100 | 100 | 100 | 100 | 100 |
| Carbon black | 55 | 55 | 55 | 55 | 55 | 55 | 55 |
| Age resistor | 1.0 | 1.0 | 1.0 | 1.0 | 1.0 | 1.0 | 1.0 |
| Vulcanization accelerator | 1.0 | 1.0 | 1.0 | 1.0 | 1.0 | 1.0 | 1.0 |
| Adhesion promoter | 1.0 | 0.0 | 3.0 | 5.0 | 0.0 | 3.0 | 0.0 |
| Sulfur | 5.0 | 5.0 | 5.0 | 5.0 | 7.0 | 7.0 | 3.0 |

Numerical values in the table indicate the amount (parts by mass) per 100 parts by mass of natural rubber

TABLE 3

|  | Reference 1 | Comparative Example 1 | Comparative Example 2 | Comparative Example 3 | Example 1 | Example 2 | Example 3 | Example 4 | Example 5 | Example 6 | Example 7 |
|---|---|---|---|---|---|---|---|---|---|---|---|
| Coating rubber (C) | Rubber 1 | Rubber 2 | Rubber 3 | Rubber 2 | Rubber 1 | Rubber 1 | Rubber 3 | Rubber 4 | Rubber 6 | Rubber 3 | Rubber 3 |

TABLE 3-continued

| | Reference 1 | Comparative Example 1 | Comparative Example 2 | Comparative Example 3 | Example 1 | Example 2 | Example 3 | Example 4 | Example 5 | Example 6 | Example 7 |
|---|---|---|---|---|---|---|---|---|---|---|---|
| Filler rubber (A) | — | — | — | Rubber 3 | Rubber 2 | Rubber 1 | Rubber 2 | Rubber 2 | Rubber 2 | Rubber 7 | Rubber 5 |
| Initial adhesiveness | B+ | D | B++ | B++ | B+ | B+ | B++ | B++ | B++ | B++ | B++ |
| Adhesiveness after shelf deterioration | B− | E | B− | C | B+ | B− | B+ | B+ | B+ | B+ | B− |
| Corrosion fatigue resistance | 100 | 100 | 101 | 120 | 120 | 121 | 121 | 121 | 121 | 121 | 121 |

The results in Table 3 show that Examples using the filler rubber (A) were excellent in corrosion fatigue resistance as compared with Reference 1 and Comparative Examples 1 and 2 without the filler rubber (A). Above all, Examples 1, 3, and 4 proved that excellent corrosion fatigue resistance could be achieved while maintaining adhesive performance equivalent to that of Reference 1 even though an adhesion promoter was not contained in the filler rubber (A).

Moreover, Examples in which the amount of the adhesion promoter contained in the coating rubber (C) was equal to or more than the amount of the adhesion promoter contained in the filler rubber (A) were found to particularly exert excellent adhesiveness after shelf deterioration as compared with Comparative Example 3 in which the amount of the adhesion promoter contained in the coating rubber (C) was less than the amount of the adhesion promoter contained in the filler rubber (A).

Note that Example 6 in which the amount of sulfur contained in the filler rubber (A) was less than the amount of sulfur contained in the coating rubber (C) was remarkably easy to handle because advancement of vulcanization before the vulcanization step can be suppressed effectively.

DESCRIPTION OF REFERENCE NUMERALS

1: core;
1a: core filament;
2: sheath;
2a: sheath filament;
3a: cord;
4: filler rubber (A) layer;
5: core strand;
6: sheath strand;
7: coating rubber (C) layer;
9: core supply;
9a: core portion;
10: sheath supply;
10a: sheath filament;
11: wire collector;
11a: bundled filaments;
12: wire twisting machine;
13: rubber coater;
13a: rubber-coated filament;
15: cord;
16: rubber extruder;
17: rubber extruder screw;
18: rubber extruder head portion;
19: filler rubber (A);
20: cord guide;
21: base cap;
27: core;
28: sheath;
30: sample;
31: pulley;
32: chuck;
50: core strand supply;
50a: core strand;
51: rubber extruder;
52: rubber extruder head portion;
53: rubber coater;
55: sheath strand supply;
55a: sheath strand;
56: straightener;
57: cord reel;
87a: multi twist cord.

The invention claimed is:

1. A rubber-steel hybrid cord formed by twisting a plurality of sheath strands around a core strand in which a periphery of and space surrounded by a plurality of core filaments constituting the core strand is coated or filled with a filler rubber (A), thereby forming a multi-twist steel cord, and coating an outer surface of the multi-twist steel cord with a coating rubber (C), wherein an amount of an adhesion promoter contained in the coating rubber (C) is more than an amount of an adhesion promoter contained in the filler rubber (A), and the amount of the adhesion promoter contained in the coating rubber (C) is 1.0 to 3.0 parts by mass, and the amount of the adhesion promoter contained in the filler rubber (A) is 0 to 3.0 parts by mass, relative to 100 parts by mass of the rubber component, and an amount of sulfur in the filler rubber (A) is less than an amount of sulfur contained in the coating rubber (C), and the amount of sulfur contained in the coating rubber (C) is 5.0 to 7.0 parts by mass, and the amount of sulfur contained in the filler rubber (A) is 3.0 to 5.0 parts by mass, relative to 100 parts by mass of the rubber component.

2. The rubber-steel hybrid cord according to claim 1, wherein the filler rubber (A) does not contain any adhesion promoter.

3. A pneumatic radial tire comprising a reinforcement layer made including the rubber-steel hybrid cord according to claim 1.

4. A pneumatic radial tire comprising a reinforcement layer made including the rubber-steel hybrid cord according to claim 2.

* * * * *